(12) United States Patent
Chimner et al.

(10) Patent No.: US 9,248,833 B2
(45) Date of Patent: Feb. 2, 2016

(54) PREDICTIVE VEHICLE STABILITY CONTROL METHOD

(71) Applicant: Eaton Corporation, Cleveland, OH (US)

(72) Inventors: Christian T. Chimner, Royal Oak, MI (US); John A. Grogg, LaOtto, IN (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 14/572,024

(22) Filed: Dec. 16, 2014

(65) Prior Publication Data

US 2015/0105990 A1 Apr. 16, 2015

Related U.S. Application Data

(63) Continuation of application No. PCT/US2013/031469, filed on Mar. 14, 2013.

(60) Provisional application No. 61/662,553, filed on Jun. 21, 2012.

(51) Int. Cl.
*B60T 8/17* (2006.01)
*B60T 7/12* (2006.01)
*B60W 30/02* (2012.01)
(Continued)

(52) U.S. Cl.
CPC ...... *B60W 30/02* (2013.01); *B60T 7/12* (2013.01); *B60T 8/1755* (2013.01); *B60W 40/114* (2013.01); *B60T 2201/14* (2013.01)

(58) Field of Classification Search
USPC ............ 701/70–71, 78, 82, 41; 303/140, 146, 303/113.1, 440
See application file for complete search history.

(56) References Cited

U.S. PATENT DOCUMENTS 5,001,636 A * 3/1991 Shiraishi ............... B60K 28/16
  180/422
5,333,058 A * 7/1994 Shiraishi ............... B60K 28/16
  303/146

(Continued)

FOREIGN PATENT DOCUMENTS

DE 198 30 561 A1 6/1999
EP 0 911 234 A2 4/1999

(Continued)

OTHER PUBLICATIONS

A Research on Generalized Predictive Control for Vehicle Yaw Rate; Wu Yihu; Song Dandan; Hou Zhixiang; Yuan Xiang Control Conference, 2007. CCC 2007. Chinese; Year: 2007; pp. 30-33, DOI: 10.1109/CHICC.2006.4347002.*

(Continued)

*Primary Examiner* — Cuong H Nguyen
(74) *Attorney, Agent, or Firm* — Dykema Gossett PLLC

(57) ABSTRACT

A method of controlling vehicle stability includes the steps of obtaining a measured yaw rate from the vehicle, generating a predicted yaw rate based on the measured yaw rate, calculating a first error signal based on a difference between the measured yaw rate and a desired yaw rate, calculating a second error signal based on a difference between the predicted yaw rate and the desired yaw rate, and sending a selected one of the first and second error signals to a yaw controller to conduct stability control. The predicted yaw rate can be generated by sending the measured yaw rate through a lead filter.

21 Claims, 6 Drawing Sheets

(51) Int. Cl.
*B60T 8/1755* (2006.01)
*B60W 40/114* (2012.01)

(56) References Cited

U.S. PATENT DOCUMENTS

| | | | | |
|---|---|---|---|---|
| 5,480,219 | A * | 1/1996 | Kost | B60T 8/172 303/146 |
| 5,627,756 | A * | 5/1997 | Fukada | B60T 8/1755 180/197 |
| 5,710,705 | A * | 1/1998 | Eckert | B60T 8/17551 180/197 |
| 5,711,023 | A * | 1/1998 | Eckert et al. | 701/70 |
| 5,711,024 | A * | 1/1998 | Wanke | 701/82 |
| 5,732,377 | A * | 3/1998 | Eckert | B60T 8/1755 303/140 |
| 5,746,486 | A | 5/1998 | Paul et al. | |
| 5,878,357 | A * | 3/1999 | Sivashankar | G01P 3/44 303/140 |
| 6,035,251 | A * | 3/2000 | Hac et al. | 701/70 |
| 6,101,434 | A | 8/2000 | Irie et al. | |
| 6,175,790 | B1 | 1/2001 | Lin et al. | |
| 6,219,610 | B1 * | 4/2001 | Araki | 701/72 |
| 6,547,343 | B1 * | 4/2003 | Hac | B60T 8/1755 303/140 |
| 6,625,527 | B1 * | 9/2003 | Ding et al. | 701/30.6 |
| 6,631,317 | B2 * | 10/2003 | Lu | B60G 17/016 340/440 |
| 6,983,818 | B2 | 1/2006 | Fujioka et al. | |
| 7,120,528 | B2 * | 10/2006 | Salib | B60G 17/0162 701/45 |
| 7,337,053 | B2 | 2/2008 | Piyabongkarn et al. | |
| 7,734,407 | B2 * | 6/2010 | Asano | 701/70 |
| 7,739,014 | B2 * | 6/2010 | Lu et al. | 701/48 |
| 7,873,454 | B2 | 1/2011 | Piyabongkarn et al. | |
| 7,970,512 | B2 * | 6/2011 | Lu et al. | 701/41 |
| 2005/0012391 | A1 * | 1/2005 | Kato et al. | 303/155 |
| 2005/0246085 | A1 * | 11/2005 | Salib | B60G 17/0162 701/70 |
| 2005/0267683 | A1 | 12/2005 | Fujiwara et al. | |
| 2009/0118905 | A1 | 5/2009 | Takenaka et al. | |
| 2009/0210112 | A1 | 8/2009 | Waldbauer et al. | |
| 2010/0106378 | A1 | 4/2010 | O'Dea et al. | |
| 2010/0286871 | A1 | 11/2010 | Kobayashi et al. | |

FOREIGN PATENT DOCUMENTS

| | | |
|---|---|---|
| EP | 2 112 042 A1 | 10/2009 |
| GB | 2480852 A | 12/2011 |
| JP | 2006213261 A * | 8/2006 |
| JP | 2006321471 A * | 11/2006 |
| JP | 2007320525 A * | 12/2007 |
| JP | 2009214774 A * | 9/2009 |
| WO | WO94/14640 * | 7/1994 |

OTHER PUBLICATIONS

Predictive Yaw Stability Control of a Brake-By-Wire Equipped Vehicle via Eddy Current Braking; Anwar, S. American Control Conference, 2007. ACC '07; Year: 2007; pp. 2308-2313, DOI: 10.1109/ACC.2007.4282822.*

A recursive neural networks model for ship maneuverability prediction; Forng-Chen Chiu; Tun-Li Chang; Jenhwa Go; Shean-Kwang Chou; Wei-Chung Chen; OCEANS '04. MTTS/IEEE Techno-OCEAN '04; Year: 2004, vol. 3; pp. 1211-1218 vol. 3, DOI: 10.1109/OCEANS.2004.1405752.*

Study on stability control of distributed drive electric vehicle under critical conditions; Teng Guowen; Xiong Lu; Feng Yuan; Zhang Wuxue; Control Conference (CCC), 2014 33rd Chinese; Year: 2014; pp. 233-238, DOI: 10.1109/ChiCC.2014.6896627.*

Design of vehicle stability control of distributed-driven electric vehicle based on optimal torque allocation; Hu Ying; Zhang Xizheng; Wang Yao-nan; Control Conference (CCC), 2014 33rd Chinese; Year: 2014; pp. 195-200, DOI: 10.1109/ChiCC.2014.6896621.*

Improving yaw stability control in severe instabilities by means of a validated model of driver steering; Markkula, G.; Eklov, J.; Laine, L.; Wikenhed, E.; Frojd, N.; Intelligent Vehicles Symposium (IV), 2015 IEEE; Year: 2015; pp. 18-23, DOI: 10.1109/IVS.2015.7225656.*

Stability control for lateral vehicle motion with uncertain parameters and external nonlinearities; Gao Huijun; Sun Weichao; Yin Shen; Kaynak, O.; Control Conference (CCC), 2013 32nd Chinese; Year: 2013; pp. 2733-2738.*

Study on stability control of 4WD EV based on sliding mode control; Jie He; Lu Xiong; Zhuoping Yu; Yuan Feng; TENCON 2013-2013 IEEE Region 10 Conference (31194); Year: 2013; pp. 1-4, DOI: 10.1109/TENCON.2013.6718901.*

European Patent Office; International Search Report and Written Opinion issued in corresponding International Application No. PCT/US2013/031469. Date of Mailing: May 24, 2013.

* cited by examiner

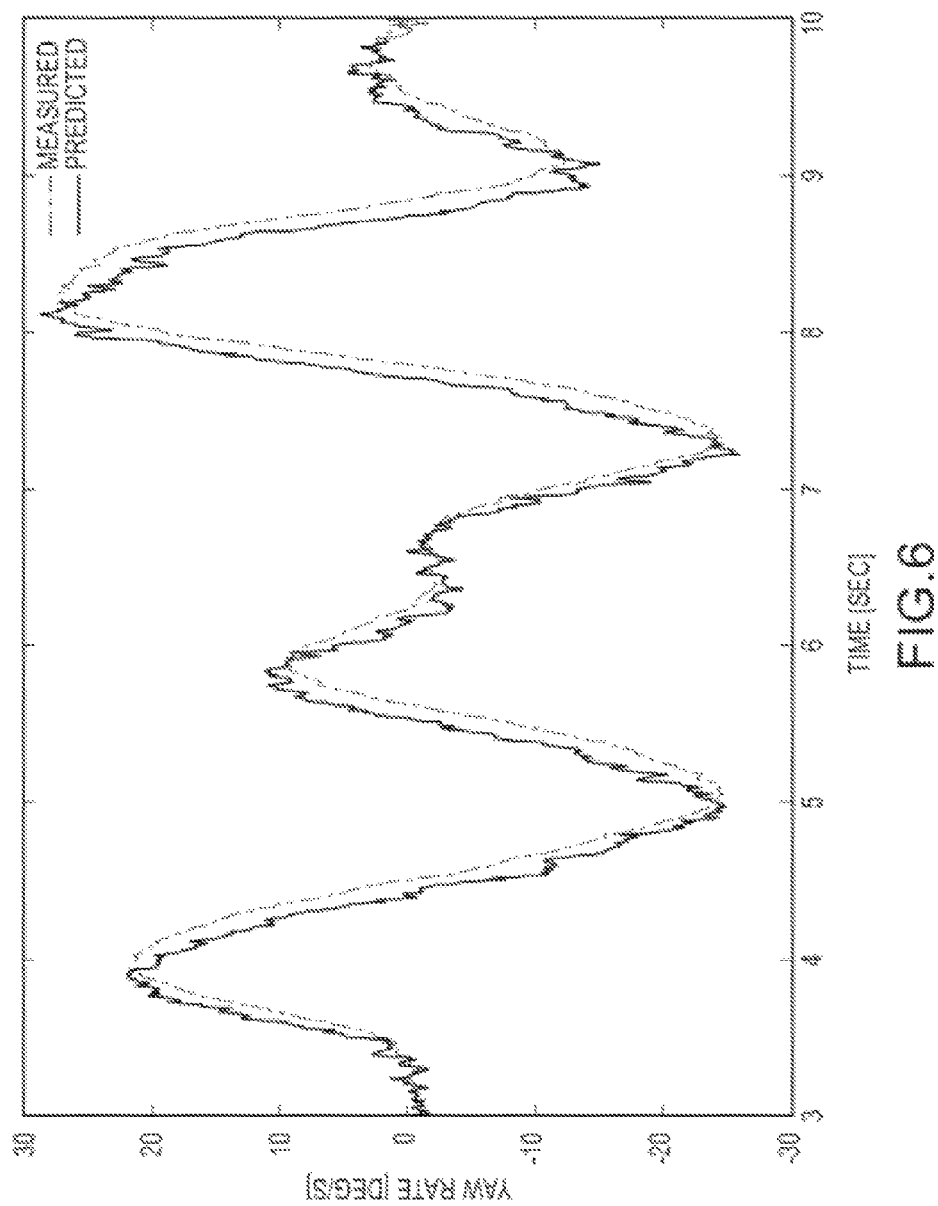

PREDICTIVE VEHICLE STABILITY CONTROL METHOD

CROSS-REFERENCE TO RELATED APPLICATIONS

This application is a continuation of and claims the benefit of PCT Application No. PCT/US2013/031469, filed on Mar. 14, 2013, which claims the benefit of U.S. Provisional Application Ser. No. 61/662,553, filed Jun. 21, 2012, which applications are fully incorporated herein by reference.

TECHNICAL FIELD

The present teachings relate to vehicle stability control, and more particularly to active vehicle stability control using predictive methodologies.

BACKGROUND

Vehicle stability systems may engage anti-lock braking systems (ABS) and/or electronically-controlled limited-slip differentials (ELSDs) to improve vehicle traction and stability. For example, when a vehicle attempts to accelerate or climb on a split-mu, low-high friction surface, the ABS and the ELSD may be controlled to send more driving torque to the driven wheel so the vehicle can maintain longitudinal motion, sending more traction torque to the higher friction wheel. However, at higher vehicle speeds, yaw stability must be carefully controlled, particularly near the vehicle's stability limit, to prevent undesired yaw motion so the vehicle does not deviate laterally from the driver's intended direction.

Generally, yaw control in the stability system can be conducted by comparing a desired vehicle yaw rate with a measured vehicle yaw rate obtained from an on-board Inertia Measurement Unit (IMU) sensor. The desired yaw rate can be calculated in real time using a vehicle model calibrated with the desired vehicle handling, characteristics. When the measured yaw rate differs from the desired yaw rate, a yaw controller is triggered to correct the yaw rate and reduce the difference between the measured and desired values.

A fast response time is desirable to achieve proper vehicle yaw control. However, actuator and sensor delay can significantly delay corrections to an input in the yaw controller and therefore delay engagement and disengagement of the ABS and/or the ELSD for stability control. This delay can reduce the overall effectiveness of the vehicle yaw control system. Thus, it is important to minimize delays in both engaging and disengaging the vehicle stability system.

There is a desire for a yaw control that has a fast response time to minimize response time delay in a vehicle stability system.

SUMMARY

One aspect of the present teachings is directed to a method of controlling vehicle stability. The method includes the steps of obtaining a measured yaw rate from the vehicle, generating a predicted yaw rate based on the measured yaw rate, calculating a first error signal based on a difference between the measured yaw rate and a desired yaw rate, calculating a second error signal based on a difference between the predicted yaw rate and the desired yaw rate, and sending the greater of the first and second error signal to a yaw controller to conduct stability control.

Another aspect of the present teachings is directed to a method of controlling stability of a vehicle. The method includes obtaining a measured yaw rate from the vehicle, generating a predicted yaw rate based on the measured yaw rate, wherein the predicted yaw rate is obtained by sending the measured yaw rate through a lead filter, calculating a first error signal based on a difference between the measured yaw rate and a desired yaw rate, calculating a second error signal based on a difference between the predicted yaw rate and the desired yaw rate, sending the greater of a saturated value of the first and second error signal to a yaw controller, which generates a yaw command, and sending the yaw command to at least one of an anti-lock braking system and an electronic limited slip differential to conduct stability control.

Another aspect of the teachings is directed to a vehicle stability control system using the above methods.

Various aspects of the present teachings will become apparent to those skilled in the art from the following detailed description of the embodiments, when road in light of the accompanying drawings.

BRIEF DESCRIPTION OF THE DRAWINGS

Embodiments of the invention will now be described, by way of example, with reference to the accompanying drawings, wherein:

FIG. 6 is an example illustrating a predicted yaw rate and a measured yaw rate.

DETAILED DESCRIPTION

Reference will now be made in detail with respect to embodiments of the present teachings, examples of which are described herein and illustrated in the accompanying drawings. While concepts will be described in conjunction with embodiments, it will be understood that the invention is not intended to limit the specific disclosures associated with the embodiments. On the contrary, the invention is intended to cover alternatives, modifications and equivalents, which may be included within the spirit and scope of the invention as defined by the appended claims.

Figure 1:
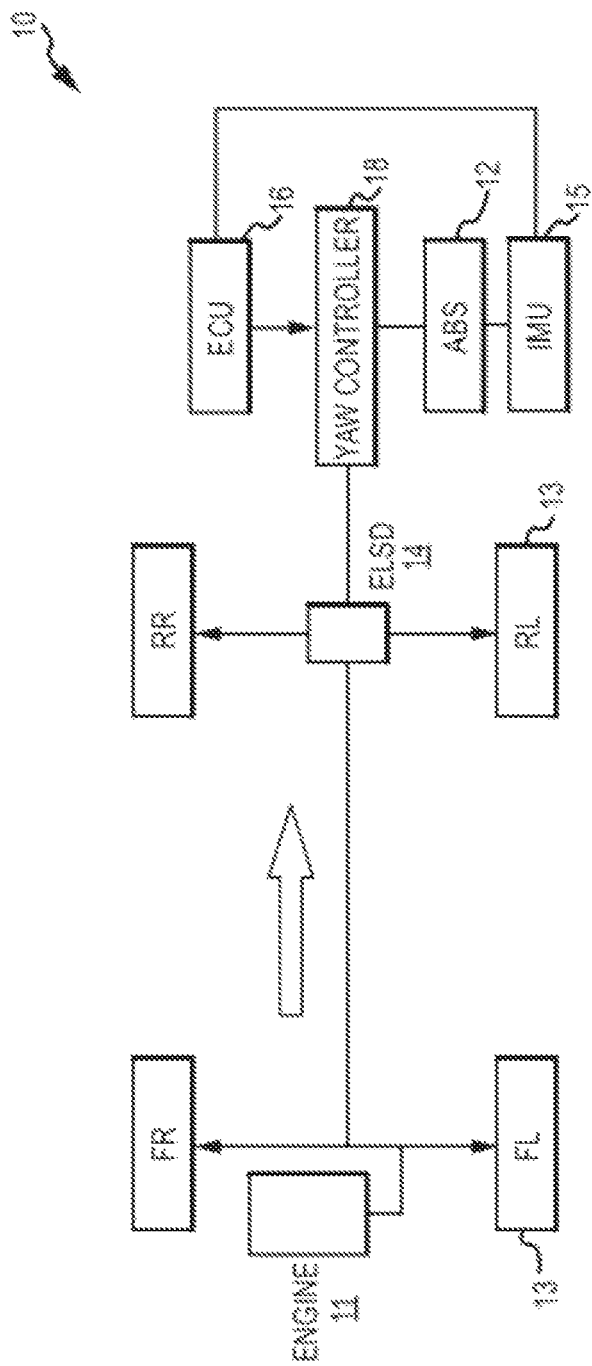
FIG. 1 is a schematic diagram of a vehicle stability system incorporating a yaw control according to an aspect of the teachings.

FIG. 1 is a schematic diagram of a vehicle 10 that can incorporate a vehicle stability control system according, to one aspect of the present teachings. The vehicle 10 may include an engine 11, an anti-lock brake system (ABS) 12 that controls braking to wheels 13, and an electronically limited slip differential (ELSD) 14. Although FIG. 1 shows the ELSD 14 disposed in the rear axle, the ELSD 14 may be placed in the front axle or in both the front and rear axles without departing from the scope of the teachings. An inertia measurement unit (IMU) sensor 15 monitors the yaw rate of the vehicle 10 and sends it to an electronic control unit (ECU) 16 having a yaw controller 18. The ECU 16 can use the measured yaw rate in a yaw control strategy so that the yaw controller 18 in the ECU 16 can output a yaw command signal to vehicle 10 components, such as but not limited to the ABS 12 and the ELSD 14, for stability control as described in greater detail below.

Figure 2:
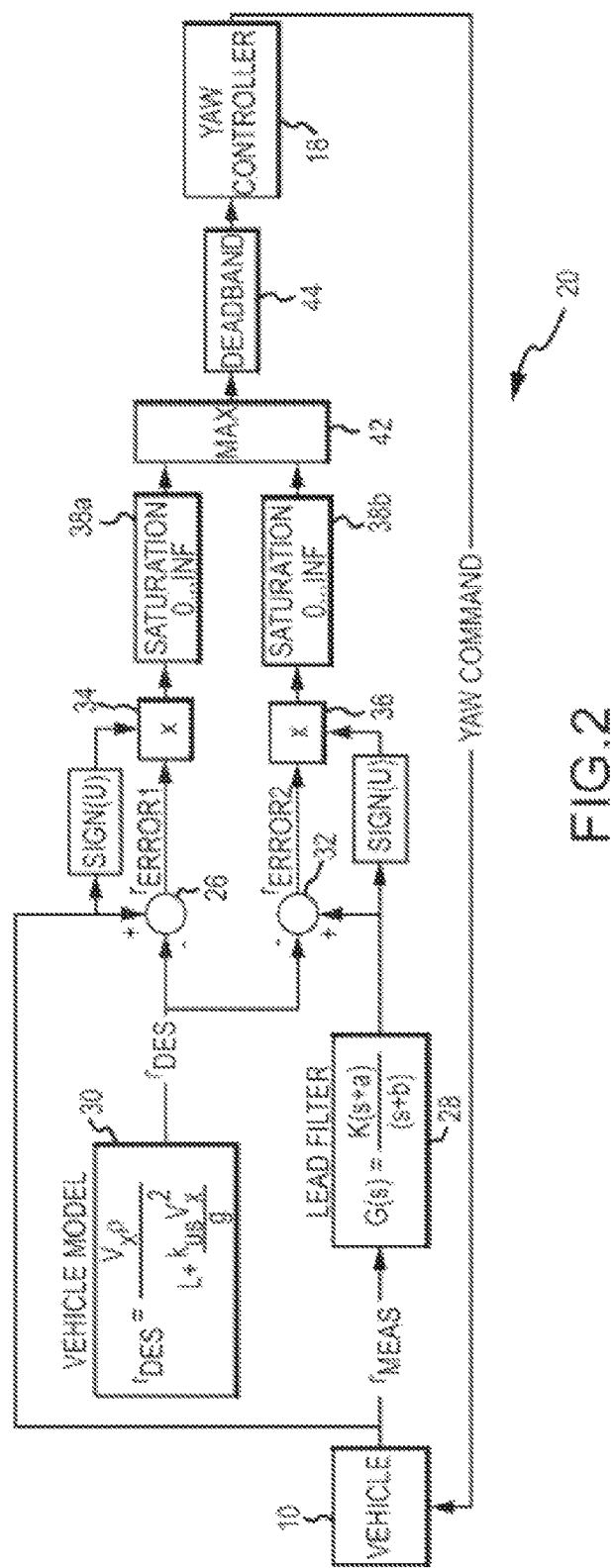
FIG. 2 is a block diagram illustrating a yaw control strategy according to an aspect of the teachings.

FIG. 2 is a block diagram illustrating a yaw control strategy 20 according to one aspect of the present teachings. Generally, the strategy 20 can provide a yaw command to one or more components (e.g., an ABS or an ELSD in a vehicle 10 to control engagement and disengagement of a stability control system in the vehicle 10. The vehicle 10 outputs a measured yaw rate $r_{MEAS}$. Note that the terms "measured yaw rate" and "feedback" are used interchangeably in the present description, with the term "feedback" referring more particularly to the measured yaw rate $r_{MEAS}$ after yaw control has been conducted. The measured yaw rate $r_{MEAS}$ is sent to a first comparator 26 and a lead filter 28.

The first comparator 26 compares the measured yaw rate $r_{MEAS}$ with a model of a desired yaw rate $r_{DES}$ 30. The desired yaw rate $r_{DES}$ can be approximated and characterized by the following equation:

$$r_{DES} = \frac{V_x \rho}{L + \frac{k_{us} V_x^2}{g}} \quad \text{eq. (1)}$$

where $V_x$ is the vehicle speed, $\rho$ is the vehicle steer angle, $L$ is the wheelbase length, $k_{us}$ is the vehicle understeer gradient, and $g$ is the gravitational constant. The first comparator 26 outputs the difference between the measured yaw rate $r_{MEAS}$ and the desired yaw rate $r_{DES}$ as a first error signal $r_{error1}$.

The lead filter 28 is included in the yaw control strategy 20 to predict a vehicle yaw rate before receiving actual yaw feedback (i.e., a change in the measured yaw rate $r_{MEAS}$) from the vehicle 10. The output of the lead filter 28 will have a negative time shift and lead the input. The measured yaw rate $r_{MEAS}$ is sent through the lead filter 28, and the lead filter 28 outputs a predicted yaw rate $r_{PRED}$. The predicted yaw rate $r_{PRED}$ is the lead filter's response to the measured yaw rate $r_{MEAS}$. The lead filter is characterized by the following transfer function G(s):

$$G(s) = \frac{Y(s)}{X(s)} = K \frac{(s+a)}{(s+b)} \quad \text{eq. (2)}$$

where $X(s)$ is the input signal (i.e., the measured yaw rate $r_{MEAS}$), $Y(s)$ is the output signal, $K$ is the filter gain, $-a$ is the filter zero, and $-b$ is the filter pole, with $b$ being greater than $a$. In one aspect of the teachings, $a$, $b$, and $K$ may be chosen so that the output of the lead filter 28 has a magnitude of 0 db (i.e., the same magnitude as the input) and a phase shift in the time domain equal to a desired prediction time.

The predicted yaw rate $r_{PRED}$ output by the lead filter 28 and the desired yaw rate $r_{DES}$ output by the model 30 may be sent to a second comparator 32. The second comparator 32 outputs the difference between the predicted yaw rate $r_{PRED}$ and the desired yaw rate $r_{DES}$ 30 as a second error signal $r_{Error2}$.

The first and second error signals $r_{Error1}$, $r_{Error2}$ are then each sent to a multiplier 34, 36 where the first error signal $r_{Error1}$ is multiplied by the sign of the measured yaw rate $r_{MEAS}$, and the second error signal $r_{Error2}$ is multiplied by the sign of $r_{PRED}$.

In the aspect of the present teachings shown in FIG. 2, the control strategy 20 designed to activate when the vehicle is oversteering. To do this, the first and second error signals $r_{Error1}$, $r_{Error2}$ are sent to saturation functions 38a, 38b so that only positive error signals are sent to the yaw controller 18. As shown in FIG. 2, the saturation functions 38a, 38b allow the error signals $r_{Error1}$, $r_{Error2}$ to pass through if they are positive and block them if they are negative. The two error signals $r_{Error1}$, $r_{Error2}$ are then sent through a third comparator 42, which outputs the maximum of the two error signals. The maximum error signal is then passed through a deadband filter 44, which blocks small error signals from being output to the yaw controller 18. The deadband filter 44 prevents unwanted engagements of the stability control in the vehicle 10 when the yaw error is low. Since only positive error signals $r_{Error1}$, $r_{Error2}$ reach the yaw controller 18 (because the saturation functions 38a, 38b prevent negative error signals from passing through), the control strategy 20 in FIG. 2 activates only during oversteer conditions.

Figure 3:
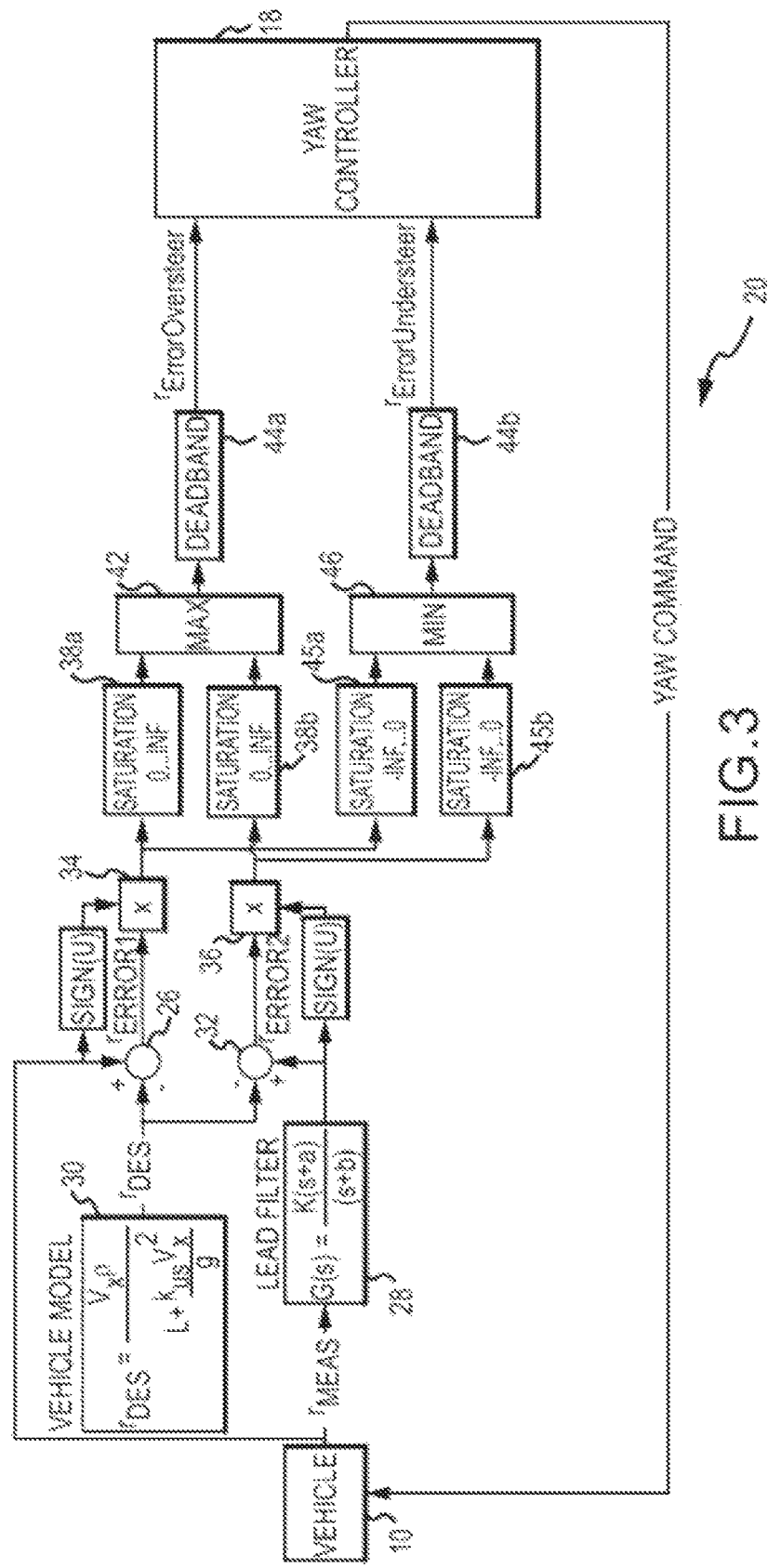
FIG. 3 is a block diagram illustrating a yaw control strategy according to another aspect of the teachings.

A variation of the control strategy 20 is shown in FIG. 3. This control strategy 20 can activate during both oversteer and understeer conditions. For oversteer conditions, the control strategy 20 in FIG. 3 works the same way as the control strategy 20 in FIG. 2, with the saturation functions 38a, 38b allowing only positive error signals to pass through and the third comparator 42 outputting the maximum of the two error signals. For understeer conditions, the two error signals $r_{Error1}$, $r_{Error2}$ can also be sent through additional saturation functions 45a, 45b that allow the error signals $r_{Error1}$, $r_{Error2}$ to pass through if they are negative and block them if they are positive. The negative error signals $r_{Error1}$, $r_{Error2}$ are then sent to a fourth comparator 46 that outputs the minimum of the two error signals. Two deadband filters 44a, 44b receive the outputs of the comparators 42, 46 to prevent unwanted engagements of the stability control strategy 20 when the yaw error is low. In this variation, both positive and negative signals reach the law controller 18, so the control strategy 20 activates during both oversteer and understeer conditions if the error is large enough to pass through either of the deadband filters 44a, 44b.

In both embodiments described above, the yaw controller 18 responds to the error signal output from the deadband filter 44 by outputting a yaw command to the vehicle 10. In one aspect of the teachings, the yaw controller 18 can be implemented through a set of cascading proportional-integral-derivative controllers (PIDs). In one example, a first PID generates a clutch torque command in response to the yaw error. The clutch torque command may then be converted to a desired clutch pressure using a model tuned for the vehicle's 10 particular application. The desired clutch pressure can then be compared to an actual clutch pressure, and a difference between the desired and actual clutch pressures may be used to generate a command (e.g., a pulse width modulated (PWM) voltage command) for a control valve, motor, or pump of a vehicle 10 clutch to build clutch pressure for clutch engagement. For example, the PWM command may be proportional to a control current sent to the valve, motor, or pump. If a ABS system is used for stability control, a similar process may be used to generate a brake torque command in place of the clutch torque command. Regardless of how the yaw controller 18 output is used by the vehicle 10, the yaw command output by the yaw controller 18 is sent to components in the vehicle 10 (e.g., clutches, differentials, braking systems, etc.) that can be operated to stabilize the vehicle 10.

By using the larger of the two error signals, engagement of the stability control in the vehicle 10 will be triggered faster due to the negative phase shill of the lead filter. Since the original error signal lags the output of the lead filter 28, yaw control terminates when the first yaw rate error $r_{Error1}$ (which is calculated from the measured yaw rate $r_{MEAS}$) drops below the deadband filter 44 threshold. More particularly, estimating, the yaw rate $r_{DES}$, shifting the measured yaw rate $r_{MEAS}$ backwards in time, calculating error signals based on both the predicted yaw rate and the measured yaw rate, and operating the yaw controller 18 based only on the extremes of the error signals (either a maximum or a minimum error signal) causes the yaw controller 18 to react to the predicted yaw rate before it even receives information regarding the measured yaw rate, thereby providing fast stability control. Also, as the predicted yaw rate approaches the measured yaw rate, the time shill of the measured yaw rate will cause the second error signal $r_{Error2}$ to decay faster than the first error signal $r_{Error1}$ and thereby cause the yaw controller 18 to react to $r_{Error1}$. The control strategy 20 therefore reduces the engagement time while maintaining the original control termination point. By reducing the engagement time, the overall effectiveness of the stability controller is improved. By utilizing the lead filter feedback in combination with real time feedback, the stability system engagement time can be greatly reduced.

Figure 4:
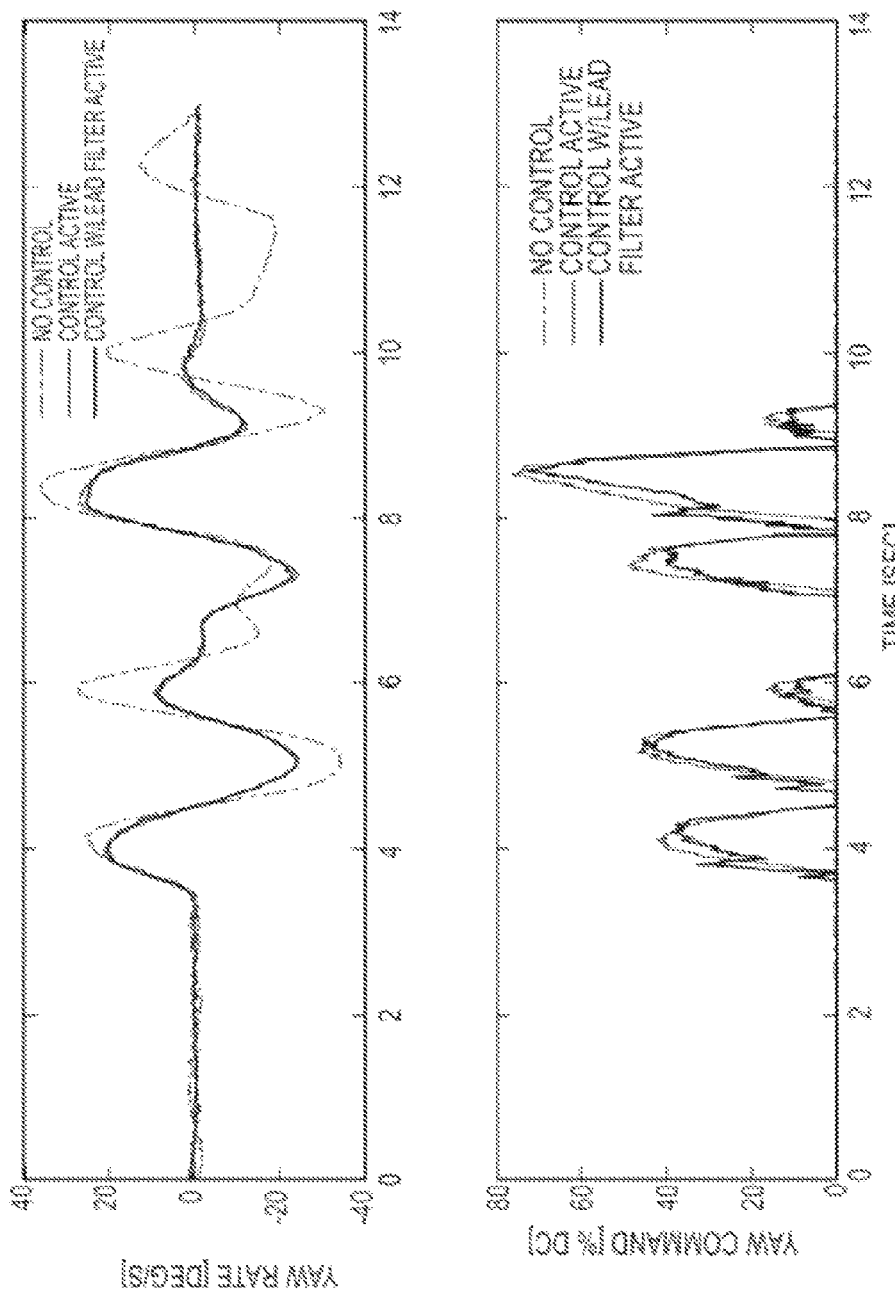
FIG. 4 is an examples of test results using a yaw control strategy according to an aspect of the teachings.
Figure 5:
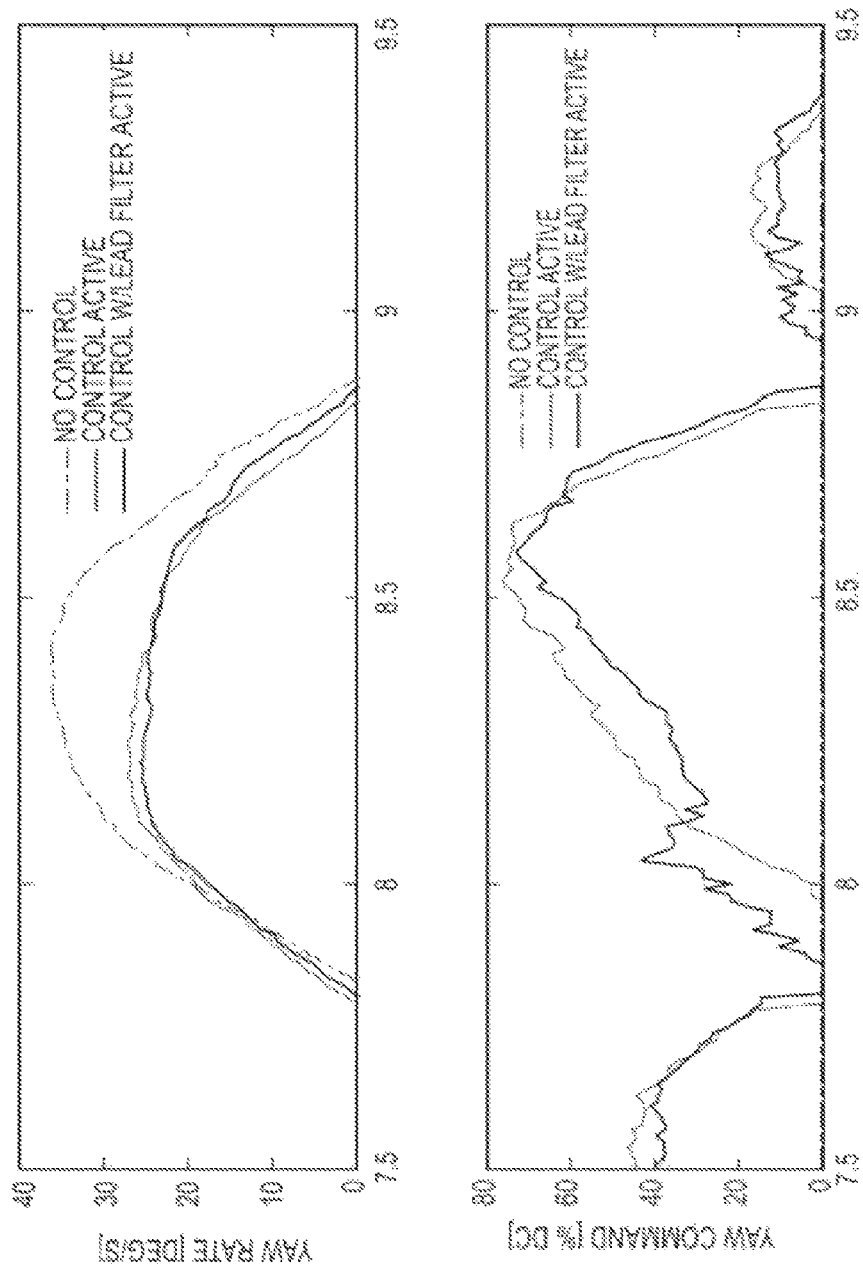
FIG. 5 is an expanded example of test results using a yaw control strategy according to an aspect of the teachings.

FIG. 4 illustrates sample test results obtained during a double lane change test using the yaw control strategy 20 described above. For comparison, the test results show the yaw rate (in degrees per second) and yaw command (in percent duty cycle of the PWM command) The graphs show test results without any active stability control, with stability control but without a lead filter, and with stability control having an activated lead filter. FIG. 5 illustrates the same results shown in FIG. 4 within the 7.5 second to 9.5 second time range to show the differences between the test results in more detail.

For the illustrated sample tests, the lead filter 28 was tuned to predict the vehicle yaw rate 100 ms in advance of the measured yaw rate. This directly correlates to a 100 ms reduction in engagement time. In the test results, a yaw control strategy 20 using a lead filter 28 can provide a 17% improvement in peak yaw damping when compared to a normal feedback strategy (a 10.7 degrees per second reduction with a lead filter 28 vs. 9.1 degrees per second reduction without a lead filter 28). The control strategy 20 described above therefore reduces the yaw rate more quickly and to a greater degree than currently known strategies, making it more effective in maintaining, vehicle stability.

FIG. 6 illustrates one example of a predicted yaw rate output by the lead filter 28 compared with an actual measured yaw rate. As can be seen in FIG. 6, the predicted yaw rate output by the lead filter 28 is very close to the actual measured yaw rate.

It will be appreciated that the above teachings are merely exemplary in nature and is not intended to limit the present teachings, their application or uses. While specific examples have been described in the specification and illustrated in the drawings, it will be understood by those of ordinary skill in the art that various changes may be made and equivalents may be substituted for elements thereof without departing from the scope of the present teachings as defined in the claims. Furthermore, the mixing and matching of features, elements and/or functions between various examples is expressly contemplated herein so that one of ordinary skill in the art would appreciate from this disclosure that features, elements and/or functions of one example may be incorporated into another example as appropriate, unless described otherwise, above. Moreover, many modifications may be made to adapt a particular situation or material to the teachings of the present disclosure without departing from the essential scope thereof. Therefore, it is intended that the present teachings not be limited to the particular examples illustrated by the drawings and described in the specification as the best mode presently contemplated for carrying out the teachings of the present disclosure, but that the scope of the present disclosure will include any embodiments falling within the foregoing description and the appended claims.

What is claimed is:

1. A method of controlling stability of a vehicle, comprising:
   obtaining a measured yaw rate from the vehicle;
   generating a predicted yaw rate, wherein the predicted yaw rate is an output of a lead filter configured to determine the predicted yaw rate based on the measured yaw rate;
   calculating a first error signal based on a difference between the measured yaw rate and a desired yaw rate;
   calculating a second error signal based on a difference between the predicted yaw rate and the desired yaw rate; and
   sending a selected one of the first and second error signal to a yaw controller to conduct stability control.

2. The method of claim 1, wherein the predicted yaw rate is generated by sending the measured yaw rate through the lead filter.

3. The method of claim 1, wherein the sending step comprises sending a maximum of the first and second error signals to the yaw controller to conduct stability control during an oversteering condition.

4. The method of claim 3, wherein the sending step further comprises sending a minimum of the first and second error signals to the yaw controller to conduct stability control during an understeering condition.

5. The method of claim 1, wherein the sending step comprises sending a minimum of the first and second error signals to the yaw controller to conduct stability control during an understeering condition.

6. The method of claim 1, further comprising calculating a saturated value of at least one of the first and second error signal before sending said selected one of the first and second error signal to the yaw controller.

7. The method of claim 1, further comprising sending said selected one of the first and second error signal through a deadband filter before sending said selected one of the first and second error signals to the yaw controller.

8. The method of claim 1, wherein the yaw controller sends a yaw command to at least one of an anti-lock braking system and an electronic limited slip differential to conduct stability control.

9. A method of controlling stability of a vehicle, comprising:
   obtaining a measured yaw rate from the vehicle;
   generating a predicted yaw rate, wherein the predicted yaw rate is an output of a lead filter configured to determine the predicted yaw rate based on the measured yaw rate;
   calculating a first error signal based on a difference between the measured yaw rate and a desired yaw rate;
   calculating a second error sign base on a difference between the predicted yaw rate and the desired yaw rate;
   sending a selected one of a saturated value of the first and second error signal to yaw controller, which generates a yaw command; and
   outputting the yaw command to at least one of an anti-lock braking system and an electronic limited slip differential to conduct stability control.

10. The method of claim 9, wherein the sending step comprises sending a maximum of the saturated value of first and second error signals to the yaw controller to conduct stability control during an oversteering condition.

11. The method of claim 10, wherein the sending step further comprises sending a minimum of the saturated value of the first and second error signals to the yaw controller to conduct stability control during an understeering condition.

12. The method of claim 9, wherein the sending step comprises sending a minimum of the saturated value of first and second error signals to the yaw controller to conduct stability control during an understeering condition.

13. The method of claim 9, further comprising sending said one of the saturated value of first and second error signal through a deadband filter before sending said greater of the first and second error signals to the yaw controller.

14. A vehicle stability control system, comprising:
an electronic limited slip differential;
an electronic control unit (ECU) containing a yaw controller and carrying out a yaw control strategy, wherein the yaw controller outputs a yaw command to the electronic limited slip differential to conduct stability control, wherein the yaw control strategy includes
obtaining a measured yaw rate from the vehicle;
generating a predicted yaw rate, wherein the predicted yaw rate is an output of a lead filter configured to determine the predicted yaw rate based on the measured yaw rate;
calculating a first error signal based on a difference between the measured yaw rate and a desired yaw rate;
calculating a second error signal based on a difference between the predicted yaw rate and the desired yaw rate; and
sending a selected one of the first and second error signal to the yaw controller to conduct stability control.

15. The system of claim 14, wherein the ECU generates the predicted yaw rate by sending the measured yaw rate through the lead filter.

16. The system of claim 14, wherein the ECU sends a maximum of the first and second error signals to the yaw controller to conduct stability control during an oversteering condition.

17. The system of claim 16, wherein the ECU also sends a minimum of the first and second error signals to the yaw controller to conduct stability control during an understeering condition.

18. The system of claim 14, wherein the ECU sends a minimum of the first and second error signals to the yaw controller to conduct stability control during an understeering condition.

19. The system of claim 14, wherein the controller also calculates a saturated value of at least one of the first and second error signal before sending said one of the first and second error signal to the yaw controller.

20. The system of claim 14, wherein the controller sends said selected one of the first and second error signal through a deadband filter before sending said selected one of the first and second error signals to the yaw controller.

21. The system of claim 14, further comprising an anti-lock braking system, wherein the controller sends the yaw command to the anti-lock braking system for stability control.

* * * * *